US012237509B2

(12) United States Patent
Matsubara et al.

(10) Patent No.: US 12,237,509 B2
(45) Date of Patent: Feb. 25, 2025

(54) SECONDARY BATTERY (71) Applicant: Panasonic Intellectual Property Management Co., Ltd., Osaka (JP)

(72) Inventors: Kenji Matsubara, Osaka Fu (JP); Hiroshi Kawada, Hyogo Ken (JP); Atsushi Fukui, Hyogo Ken (JP); Masanobu Takeuchi, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 595 days.

(21) Appl. No.: 17/619,707

(22) PCT Filed: Jun. 16, 2020

(86) PCT No.: PCT/JP2020/023542
§ 371 (c)(1),
(2) Date: Dec. 16, 2021

(87) PCT Pub. No.: WO2020/262102
PCT Pub. Date: Dec. 30, 2020

(65) Prior Publication Data
US 2022/0359871 A1    Nov. 10, 2022

(30) Foreign Application Priority Data
Jun. 28, 2019 (JP) .................. 2019-122322

(51) Int. Cl.
*H01M 4/583*   (2010.01)
*H01M 4/02*    (2006.01)
*H01M 10/0525* (2010.01)
*H01M 10/0562* (2010.01)

(52) U.S. Cl.
CPC ....... *H01M 4/583* (2013.01); *H01M 10/0525* (2013.01); *H01M 10/0562* (2013.01); *H01M 2004/027* (2013.01)

(58) Field of Classification Search
None
See application file for complete search history.

(56) References Cited

U.S. PATENT DOCUMENTS

| 6,911,280 B1 | 6/2005 | De Jonghe et al. | |
| 2012/0208087 A1* | 8/2012 | Yamamoto | H01M 4/525 429/223 |
| 2013/0273402 A1 | 10/2013 | Tsutsumi et al. | |
| 2016/0315353 A1* | 10/2016 | Matsushita | H01M 4/62 |
| 2017/0279159 A1* | 9/2017 | Suyama | H01M 4/5825 |
| 2019/0027745 A1 | 1/2019 | Suyama et al. | |
| 2019/0088948 A1 | 3/2019 | Tojigamori et al. | |

FOREIGN PATENT DOCUMENTS

| CN | 103872339 A | * | 6/2014 | ........ H01M 10/0525 |
| CN | 106505244 A | * | 3/2017 | |
| CN | 109037643 | * | 12/2018 | ........ H01M 10/0525 |
| JP | 11-126608 A | | 5/1999 | |
| JP | 2017212153 A | * | 11/2017 | |
| JP | 2018-73819 A | | 5/2018 | |
| JP | 2018-160342 A | | 10/2018 | |
| JP | 2019-21514 A | | 2/2019 | |
| JP | 2019-57359 A | | 4/2019 | |
| WO | 2012/042696 A1 | | 4/2012 | |
| WO | 2016/114141 A1 | | 7/2016 | |
| WO | 2017/122597 A1 | | 7/2017 | |

OTHER PUBLICATIONS

Lithium silicate—Wikipedia, available online at https://en.wikipedia.org/wiki/Lithium_silicate, date unknown.*
Sung, J.H., Kim, T., Kim, S., Hasan, F., Mohanty, S.K., Srinivasa, M.K., Reddy, S.C.m Yoo, H.D.—Li3PO4-Coated Graphite Anode for Thermo-Electrochemically Stable Lithium-Ion Batteries, Energies, 2023, 16, 6141, published on Aug. 23, 2023 (Year: 2023).*
Machine translation of CN103872339, published on Jun. 18, 2014 (Year: 2014).*
Machine translation of JP 2017-212153, published on Nov. 30, 2017 (Year: 2017).*
Machine translation of CN 106505244, published on Mar. 15, 2017 (Year: 2017).*
Machine translation of CN 109037643, published on Dec. 18, 2018 (Year: 2018).*
Extended (Supplementary) European Search Report dated Jun. 30, 2022, issued in counterpart EP application No. 20832448.3. (7 pages).
International Search Report dated Aug. 25, 2020, issued in counterpart International Application No. PCT/JP2020/023542. (2 pages).

* cited by examiner

*Primary Examiner* — Anca Eoff
(74) *Attorney, Agent, or Firm* — WHDA, LLP (57) ABSTRACT

A secondary battery including a positive electrode, a negative electrode, and an electrolytic solution. The negative electrode includes a carbon material electrochemically capable of absorbing and releasing lithium ions, and a solid electrolyte covering at least part of a surface of the carbon material and having lithium ion conductivity. The solid electrolyte includes a first compound represented by a general formula: $Li_xMlO_y$, where $0.5<x\leq9$, $1\leq y<6$, and the M1 includes at least one element selected from the group consisting of B, Al, Si, P, Ti, V, Zr, Nb, Ta, and La. The electrolytic solution includes a solvent and a lithium salt, and the solvent contains at least water.

17 Claims, 1 Drawing Sheet

SECONDARY BATTERY

TECHNICAL FIELD

The present disclosure relates to a secondary battery including an electrolytic solution containing water, and a carbon material capable of electrochemically absorbing and releasing lithium ions.

BACKGROUND ART

Secondary batteries including a non-aqueous electrolytic solution represented by a lithium ion secondary battery have a high energy density and are widely used as a power source for portable devices and the like. An organic solvent contained in the non-aqueous electrolytic solution is generally flammable, and is problematic in safety. To address this, using an electrolytic solution containing water as a solvent (hereinafter sometimes referred to as an aqueous electrolyte) has been examined.

Patent Literature 1 proposes to use, in a lithium ion secondary battery, an electrolytic solution containing water and an alkali metal salt and including a solvent in an amount of 4 mol or less per 1 mol of the alkali metal salt. Patent Document 2 proposes to use, in a lithium ion secondary battery, an electrolytic solution containing water and an alkali metal salt and including a solvent in an amount of more than 4 mol and 15 mol or less per 1 mol of the alkali metal salt. Patent Document 3 proposes to use, in a lithium ion secondary battery, an electrolytic solution containing a lithium fluoroalkylsulfonyl salt, an organic carbonate, and water in a specific molar ratio.

Patent Document 4 proposes a secondary battery including a positive electrode, a negative electrode, a separator containing a solid electrolyte with alkali metal ion conductivity, a first electrolyte, and a second electrolyte. The first electrolyte is present at least in the positive electrode and contains a first alkali metal salt and a first aqueous solvent. The second electrolyte is present at least in the negative electrode and contains a second alkali metal salt and a second aqueous solvent.

Patent Document 4 discloses disposing a coating on at least part of the surface of a negative electrode active material, such as a titanium-containing oxide. The coating includes $Li_{1.3}Ti_{1.7}Al_{0.3}(PO_4)_3$ with a NASICON structure, and $Li_{14}ZnGe_4O_{16}$ or $Li_{3.6}Ge_{0.6}V_{0.4}O_4$ with a $\gamma$-$Li_3PO_4$ structure. The coating is provided in order to increase the hydrogen overvoltage and suppress the generation of hydrogen at the negative electrode.

CITATION LIST

Patent Literature

[PTL 1] International publication No. 2016/114141
[PTL 2] International publication No. 2017/122597
[PTL 3] Japanese Laid-Open Patent Publication No. 2018-73819
[PTL 4] Japanese Laid-Open Patent Publication No. 2018-160342

SUMMARY OF INVENTION

Technical Problem

For achieving a higher battery voltage, using a carbon material as a negative electrode active material is considered to be effective because the lithium ion absorption and release potential of carbon materials is low. However, when used in combination with aqueous electrolyte, which has a narrower potential window than non-aqueous electrolytic solution, the carbon material tends to cause a reductive decomposition reaction of water when contacted with water contained in the aqueous electrolyte. At the negative electrode, the reductive decomposition reaction of water tends to more preferentially occur than the absorption reaction of lithium ions.

Moreover, protons are generated in association with decomposition of water due to the contact between the carbon material and the aqueous electrolyte, and the protons may replace lithium ions having been absorbed in the carbon material during charge, or may be inserted into the absorption site of lithium ions in the carbon material.

Therefore, when the aqueous electrolyte disclosed in Patent Literatures 1 to 4 are used, the charge and discharge reactions at the negative electrode, i.e., the absorption and release of lithium ions by the carbon material, may be inhibited, causing the secondary battery to fail to operate. Even with the coating disclosed in Patent Literature 4 disposed on the surface of the carbon material, the charge and discharge reactions at the negative electrode are insufficient.

In view of the above, one aspect of the present disclosure relates to a secondary battery, including: a positive electrode; a negative electrode; and an electrolytic solution, wherein the negative electrode includes a carbon material electrochemically capable of absorbing and releasing lithium ions, and a solid electrolyte covering at least part of a surface of the carbon material and having lithium ion conductivity, the solid electrolyte includes a first compound represented by a general formula: $Li_xM1O_y$, where $0.5 < x \leq 9$, $1 \leq y < 6$, and the M1 includes at least one element selected from the group consisting of B, Al, Si, P, Ti, V, Zr, Nb, Ta, and La, the electrolytic solution includes a solvent and a lithium salt, and the solvent contains at least water.

According to the present disclosure, it is possible to achieve a higher voltage of a secondary battery including an electrolytic solution containing water.

BRIEF DESCRIPTION OF DRAWING

The FIGURE A partially cut-away schematic oblique view of a secondary battery according to an embodiment of the present disclosure.

DESCRIPTION OF EMBODIMENTS

Figure 1:
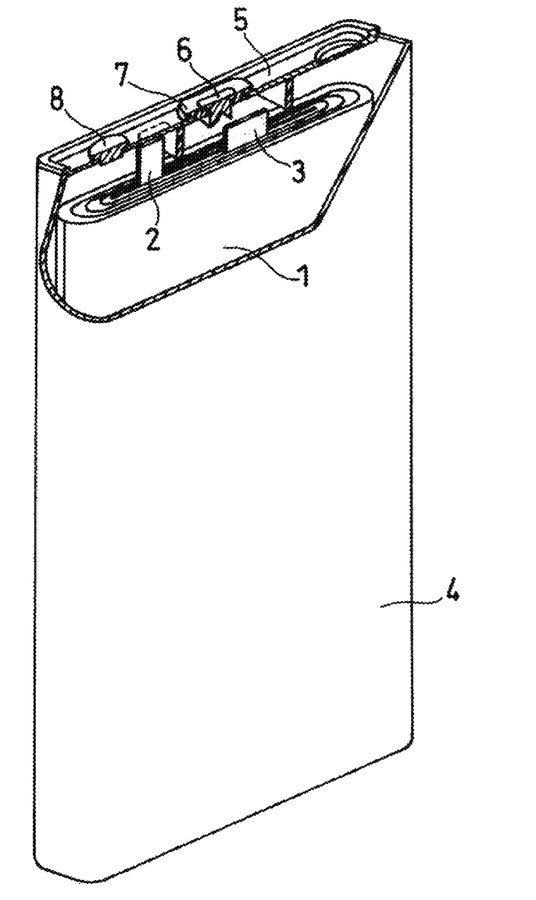

A secondary battery according to an embodiment of the present disclosure includes a positive electrode, a negative electrode, and an electrolytic solution (hereinafter sometimes referred to as an aqueous electrolyte). The negative electrode includes a carbon material capable of electrochemically absorbing and releasing lithium ions, and a solid electrolyte covering at least part of a surface of the carbon material and having lithium ion conductivity. The solid electrolyte includes a first compound represented by a general formula: $Li_xM1O_y$, where $0.5 < x \leq 9$, $1 \leq y < 6$, and the M1 includes at least one element selected from the group consisting of B, Al, Si, P, Ti, V, Zr, Nb, Ta, and La. The electrolytic solution includes a solvent and a lithium salt, and the solvent contains at least water.

The absorption and release of lithium ions by the carbon material is inhibited in some cases, when an aqueous electrolyte is used. However, by covering at least part of the surface of the carbon material with a solid electrolyte including the first compound, such inhibition is suppressed, and the secondary battery can operate. By using a carbon material as the negative electrode active material in a secondary battery including an aqueous electrolyte, a higher voltage of the secondary battery can be achieved.

The first compound has lithium ion conductivity, which allows smooth migration of lithium ions between the carbon material and the aqueous electrolyte. Furthermore, the first compound is stable to water and has a function of sufficiently repelling water. By using the solid electrolyte including the first compound, the contact between the carbon material and water contained in the aqueous electrolyte can be suppressed, and the decomposition of water at the surface of the carbon material and the proton generation associated therewith can be suppressed.

Even when protons are present in the aqueous electrolyte, the insertion of the protons into the carbon material can be suppressed by using a solid electrolyte including the first compound. Moreover, the protons can be consumed by the first compound. Specifically, the first compound can react with the protons generated at the surface of the carbon material, to produce a polymer of the first compound. For example, when the first compound is $Li_3PO_4$, the reaction represented by the following formula (1) can occur. In the formula (1), n is an integer of two or greater.

$$nLi_3PO_4 + 2(n-1)H^+ \rightarrow 2(n-1)Li^+ + Li_{n+2}P_nO_{3n+1} + (n-1)H_2O \quad (1)$$

The solid electrolyte may include a polymer of the first compound. The polymer of the first compound also has lithium ion conductivity and is stabile to water, allowing to maintain the effect of suppressing the contact between the carbon material and the aqueous electrolyte.

The coating of $Li_{1.3}Ti_{1.7}Al_{0.3}(PO_4)_3$ with a NASICON structure, or $Li_{14}ZnGe_4O_{16}$ or $Li_{3.6}Ge_{0.6}V_{0.4}O_4$ with a γ-$Li_3PO_4$ structure has a potential window which is narrow on the base potential side as compared to the first compound, and has low reduction resistance. Therefore, when using a carbon material, the lithium ion absorption and release potential of which is low, the coating is easily reductively decomposed, and due to the reductive decomposition, tends to convert into a component which is unstable to aqueous electrolyte. Furthermore, the coating tend to be less dense due to the reductive decomposition, increasing the paths through which the carbon material and the aqueous electrolyte come in contact with each other. With the coating like this, the contact between the carbon material and the aqueous electrolyte cannot be suppressed, and the decomposition of water at the surface of the carbon material cannot be suppressed, i.e., the effects as obtained with the first compound cannot be obtained.

(Solid Electrolyte)

The solid electrolyte includes at least the first compound, and may include other compounds (e.g., a second compound as described later, or when the aqueous electrolyte includes an organic solvent, a decomposition product of the organic solvent) within a range that does not impair the effects of the first compound. The proportion of the first compound in the solid electrolyte is preferably 65 mass % or more, more preferably 65 mass % or more and 93 mass % or less.

When the proportion of the first compound in the solid electrolyte is 65 mass % or more, the effect of the first compound to suppress the reductive decomposition of water at the surface of the carbon material can be remarkable. In general, the reductive decomposition potential of an organic solvent is lower than that of water, and water is more easily reductively decomposed. When the proportion of the first compound in the solid electrolyte is as high as 65 mass % or more, the reductive decomposition of water can be effectively suppressed in an aqueous electrolyte containing an organic solvent, and the absorption and release of lithium ions by the carbon material can efficiently proceed. When a second compound is formed through the reductive decomposition of the organic solvent, the formation of the second compound is unlikely to proceed competitively with the reductive decomposition of water, and as a result, a dense film of the second compound having a uniform thickness can be easily formed on the surface of the first compound. Such a film formation of the second compound is advantageous in improving the initial efficiency and reducing the internal resistance.

When the proportion of the first compound in the solid electrolyte is 93 mass % or less, the solid electrolyte can appropriately contain the second compound. The first compound, depending on its kind, can have a reduction potential which is higher than 0.05 V versus $Li/Li^+$. In this case, in the solid electrolyte, it is preferable that the surface of the first compound is covered appropriately with the second compound which is stable until 0.05 V versus $Li/Li^+$ is reached. This can improve the chemical stability of the solid electrolyte. Using the first compound and the second compound in combination as above is advantageous in improving the initial efficiency and reducing the internal resistance.

When, for example, the first compound is $Li_3PO_4$ and the second compound is LiF, the proportion of the first compound and the second compound in the solid electrolyte can be obtained by the following method.

The negative electrode is taken out from the battery, then washed with dimethyl ether (DME) or the like, and dried. Subsequently, components of the first compound and the second compound are extracted from the negative electrode active material layer using dilute hydrochloric acid, to obtain an extracted liquid. After diluted with ultrapure water, the extracted liquid is analyzed by nuclear magnetic resonance (NMR), to quantify P derived from $Li_3PO_4$ and F derived from LiF, and calculate the masses of $Li_3PO_4$ and LiF, from which the proportions of the first compound and the second compound can be determined.

(First Compound)

The first compound is represented by the general formula: $Li_xM1O_y$. The first compound includes an O—Li bond with ionic bonding property. Lithium ion hopping through the O site allows lithium ion conductivity to develop.

The M1 includes at least one element Q selected from the group consisting of B (boron), Al (aluminum), Si (silicon), P (phosphorus), Ti (titanium), V (vanadium), Zr (zirconium), Nb (niobium), Ta (tantalum), and La (lanthanum). When the M1 includes the element Q, the lithium ion conductivity can develop, and the contact between the carbon material and the aqueous electrolyte can be suppressed, in a well-balanced manner. In particular, the M1 preferably includes Si, Ta, and P, more preferably includes Si and P, and particularly preferably includes P. In this case, the reduction resistance of the first compound can be improved, and the contact between the carbon material and the aqueous electrolyte can be more stably suppressed.

The proportion of the element Q in the M1 is, for example, 80 atom % or more. The M1 may contain one or more elements other than the element Q in a small amount of 20 mass % or less. When the proportion of the element Q in the M1 is 80 atom % or more, the contact between the carbon material and the aqueous electrolyte during charge and discharge can be stably suppressed.

In the formula, x is greater than 0.5 and 9 or less, preferably greater than 0.5 and 5 or less, and y is 1 or greater and less than 6, preferably 2 or greater and 5 or less. When x and y are within the range above, the potential window on the base potential side of the first compound broadens. That is, the reduction resistance of the first compound can be improved, and the contact between the carbon material and the aqueous electrolyte can be more stably suppressed.

Note that x and y may not match the stoichiometric composition. When y is smaller than the stoichiometric composition, lithium ion permeability is likely to develop due to oxygen defect. When the M1 is P, x and y preferably satisfy $1 \leq x < 3$ and $3 \leq y < 4$. When the M1 is Si, x and y preferably satisfy $2 \leq x < 4$ and $3 \leq y < 4$.

In view of stably suppressing the contact between the carbon material and the aqueous electrolyte, the first compound preferably includes a polyoxometalate compound, and the proportion of the polyoxometalate compound in the first compound is preferably 80 mass % or more. Examples of the polyoxometalate compound include $Li_3PO_4$, lithium silicate, $Li_3BO_3$, $Li_3VO_4$, $Li_3NbO_4$, $LiZr_2(PO_4)$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, and $Li_{1.3}Al_{0.3}Ti_{1.7}(PO_4)_3$. The lithium silicate is represented by, for example, a general formula: $Li_{2u}SiO_{2+u}$, where $\frac{1}{2} \leq u \leq 2$. Examples of the lithium silicate include $Li_4SiO_4$, $Li_2SiO_3$, and $Li_2Si_2O_5$. The polyoxometalate compound may be used singly, or in combination of two or more kinds.

In particular, in view of securing lithium ion conductivity and suppressing the contact between the carbon material and the aqueous electrolyte, the first compound preferably includes at least one compound selected from the group consisting of $Li_3PO_4$, $Li_2SiO_3$, $Li_4SiO_4$, $Li_2Si_2O_5$, and $LiTaO_3$, and preferably include at least $Li_3PO_4$. The proportion of the $Li_3PO_4$ in the first compound is preferably 80 mass % or more. The first compound may comprise $Li_3PO_4$ only or in combination with, for example, a lithium silicate.

(Second Compound)

The solid electrolyte preferably includes a second compound containing a fluorine atom and an M2 atom bonded to the fluorine atom. In this case, the chemical stability of the solid electrolyte is enhanced, and the solid electrolyte can further effectively suppress the contact between the carbon material and the aqueous electrolyte. The M2 is at least one selected from the group consisting of Li, Mg, Ca, Sr, Ba, La, Ce, Sm, Ga, Bi, and Al, and is preferably Li. Specifically, the second compound includes LiF, $MgF_2$, $CaF_2$, $SrF_2$, $BaF_2$, $LaF_3$, $CeF_3$, $SmF_3$, $GaF_3$, $BiF_3$, and $AlF_3$. In particular, the second compound preferably includes LiF. In this case, the lithium ion conductivity and the chemical stability of the solid electrolyte is obtained in a well-balanced manner.

The solid electrolyte including the first compound preferably covers, in the form of film, at least part of the surface of the carbon material. In this case, the negative electrode tends to exhibit a stable charge and discharge behavior. The film of the solid electrolyte may be a film of the first compound or a film of the mixed first and second compounds, and may include a film of the first compound covering at least part of the surface of the carbon material and a film of the second compound covering at least part of the surface of the film of the first compound.

The negative electrode may include a negative electrode current collector, a layer supported on the negative electrode current collector and containing a carbon material (i.e., a negative electrode active material layer), and a solid electrolyte covering at least part of the surface of the negative electrode active material layer. The negative electrode active material layer may be a porous layer. When the negative electrode active material layer is a porous layer, the surface of the negative electrode active material layer is not limited to the outer surface of the negative electrode active material layer facing the positive electrode, and also includes the inner wall surfaces of the pores present in the negative electrode active material layer.

The solid electrolyte may cover at least part of the surface of the negative electrode current collector. When the negative electrode active material layer contains a conductive agent, the solid electrolyte may cover at least part of the surface of the conductive agent. This can suppress the contact of the negative electrode current collector and/or the conductive agent with the aqueous electrolyte, and thus can suppress the decomposition of water at the surface of the negative electrode current collector and/or the conductive agent, and the proton generation associated therewith.

The solid electrolyte preferably covers 70% or more of the surface of the carbon material. In this case, the effect of suppressing the contact between the carbon material and the aqueous electrolyte can be remarkable.

The coverage rate CR of the surface of the carbon material by the solid electrolyte can be determined by the following method.

The negative electrode is taken out from the battery, then washed with dimethyl ether (DME) or the like, and dried. The negative electrode active material layer is embedded in resin, and polished with a cross section polisher (CP), to give a sample cross section. An image (reflected electron image) of the sample cross section is obtained using a scanning electron microscope (SEM). The image is subjected to binarization, to distinguish the carbon material particles from the solid electrolyte film covering the surface of the carbon material particles, and check the distribution condition of the solid electrolyte film on the surface of the carbon material particles. Specifically, the length L1 of the contour of the particle cross section of the carbon material and the length L2 of the portion covered with the solid electrolyte film in the contour are measured, and L2/L1 multiplied by 100 is determined as a coverage rate CR. With respect to 30 carbon material particles, the coverage rate CR is measured, to obtain an average of the measured values.

The thickness of the solid electrolyte is preferably 0.5 nm or more, more preferably 0.5 nm or more and less than 50 nm, still more preferably 0.5 nm or more and 40 nm or less. The solid electrolyte is preferably covering in the form of film in the thickness within the range above. When the thickness of the solid electrolyte is 0.5 nm or more, the contact between the carbon material and the aqueous electrolyte is likely to be effectively suppressed. When the thickness of the solid electrolyte is less than 50 nm, lithium ions can migrate smoothly between the carbon material and the aqueous electrolyte, and the increase in internal resistance is likely to be suppressed.

The thickness of the solid electrolyte covering the surface of the carbon material can be determined using, for example, X-ray photoelectron spectroscopy (XPS). Specifically, the negative electrode taken out from the battery is washed with dimethyl ether (DME) or the like and dried. The active material particles in the negative electrode is analyzed for its composition by XPS. When the active material particles are the carbon material particles with their surfaces covered with the solid electrolyte film, the peak attributed to the element C gradually increases as measured deeper into the active material particles, and is saturated when a predetermined depth is reached. From empirical knowledge, the value of the depth at which the proportion of the element C in the total amount of each element reaches 45 atom % is referred to as the thickness of the film. A peak attributed to each element is measured at a predetermined depth of the film, and a molar ratio of each element is calculated on the basis of the measurement result, to determine a composition of the film, thereby to confirm that the film contains the first compound.

The amount of the solid electrolyte contained in the negative electrode is, for example, preferably 0.01 parts by mass or more and 10 parts by mass or less, more preferably 0.025 parts by mass or more and 4 parts by mass or less, per 100 parts by mass of the carbon material. When the amount of the solid electrolyte contained in the negative electrode is 0.01 parts by mass or more per 100 parts by mass of the carbon material, the covering by the solid electrolyte tends to be effective. When the amount of the solid electrolyte contained in the negative electrode is 10 parts by mass or less per 100 parts by mass of the carbon material, the packed amount of the carbon material can be easily secured, and a negative electrode having a small resistance is likely to be obtained.

In the cross section of the negative electrode active material layer, the ratio: S2/S1 of an area S2 occupied by the solid electrolyte to an area Si occupied by the carbon material is, for example, 0.0001 or greater and 0.04 or less.

The area ratio S2/S1 can be determined by the following method.

The negative electrode is taken out from the battery, then washed with dimethyl ether (DME) or the like, and dried. The negative electrode active material layer is embedded in resin, and polished with a cross section polisher (CP), to give a sample cross section. An image (reflected electron image) of the sample cross section is obtained using a scanning electron microscope (SEM). The image is subjected to binarization, to distinguish the carbon material particles from the solid electrolyte film covering the surface of the carbon material particles, and measure the area Si occupied by the carbon material and the area S2 occupied by the solid electrolyte, from which S2/S1 can be determined.

In view of reducing the reaction resistance of the negative electrode, the lithium ion conductivity in the solid electrolyte is preferably, for example, $1.0 \cdot 10^{-11}$ S/cm or more. On the other hand, in view of suppressing the decomposition of the aqueous electrolyte, the lithium ion conductivity in the solid electrolyte is, for example, preferably $1.0 \cdot 10^{-2}$ S/cm or less.

(Production of Negative Electrode)

The negative electrode is produced by a method including, for example, a first step of preparing a negative electrode precursor in which a negative electrode active material layer is supported on a surface of a negative electrode current collector, and a second step of covering at least part of a surface of the negative electrode active material layer in the negative electrode precursor with a solid electrolyte. The method may further include a third step of covering at least part of the surface of the negative electrode current collector in the negative electrode precursor with the solid electrolyte. The second step and the third step may be performed simultaneously.

(First Step)

The negative electrode precursor can be prepared by, for example, preparing a negative electrode slurry containing a negative electrode material mixture and a dispersion medium, and applying the negative electrode slurry to a surface of the negative electrode current collector, followed by drying to form a negative electrode active material layer. After drying, the negative electrode precursor may be further rolled. The negative electrode active material layer may be formed on one surface or both surfaces of the negative electrode current collector. The negative electrode material mixture may include, for example, a carbon material serving as a negative electrode active material, and a binder, and may further include a conductive agent. Examples of the dispersion medium include water, alcohols such as ethanol, ethers such as tetrahydrofuran, and N-methyl-2-pyrrolidone (NMP).

(Second Step)

In the second step, it is preferable to form a film of a solid electrolyte on at least part of a surface of the negative electrode active material layer by exposing the negative electrode precursor to an atmosphere containing a raw material of the solid electrolyte. In this case, the film of the solid electrolyte can be formed not only on the outer surface of the negative electrode active material layer but also on the inner wall surfaces of the pores within the layer. In the negative electrode current collector, the film of the solid electrolyte can be formed on the surface exposed without being covered with the negative electrode active material layer and on the surfaces exposed in the pores of the negative electrode active material layer. The atmosphere containing a raw material of the solid electrolyte is preferably at 200° C. or less, more preferably 120° C. or less. The film of the solid electrolyte is preferably formed by a liquid phase method or a gas phase method.

The liquid phase method is preferably a deposition method, a sol-gel method, or the like. The deposition method refers to, for example, a method of immersing the negative electrode precursor in a solution at a temperature sufficiently lower than 200° C. in which the raw material of the solid electrolyte is dissolved, to allow a constituent material of the solid electrolyte to deposit on the surface of the negative electrode active material layer. The sol-gel method refers to, for example, a method of immersing the negative electrode precursor in a liquid at a temperature sufficiently lower than 200° C. containing a raw material of the solid electrolyte, and then allowing intermediate particles of the solid electrolyte to settle on the surface of the negative electrode active material layer, followed by gelation.

The gas phase method includes, for example, a physical vapor deposition (PVD) method, a chemical vapor deposition (CVD) method, and an atomic layer deposition (ALD) method. The PVD method and the CVD method are usually performed at a high temperature exceeding 200° C. In the ALD method, a film of the solid electrolyte can be formed in an atmosphere of 200° C. or lower, or further 120° C. or lower, containing a raw material of the solid electrolyte.

In the ALD method, an organic compound having a high vapor pressure is used as a raw material of a solid electrolyte. By vaporizing such a raw material, the raw material in a molecular state can be easily interacted with the surface of the negative electrode active material layer. The raw material in a molecular state can easily travel and reach the pores inside the negative electrode active material layer, likely forming a homogeneous film of the solid electrolyte on the inner wall surfaces of the pores, too. A homogeneous film of the solid electrolyte is likely to be formed also on the surface of the negative electrode current collector exposed in the pores of the negative electrode active material layer.

In the ALD method, for example, a film of the solid electrolyte can be formed on a surface of the negative electrode active material layer in the following procedure.

When the ALD method is used to form a film of the first compound, a gaseous first raw material is first introduced into a reaction chamber in which the negative electrode precursor is placed. Thereafter, when the surface of the negative electrode precursor is covered with a monomolecular layer of the first raw material, the self-stop mechanism by the organic group of the first raw material works, which inhibits further adsorption of the first raw material onto the surface of the negative electrode precursor. Excess of the first raw material is purged with an inert gas or the like, and removed from the reaction chamber.

Next, a gaseous second raw material is introduced into the reaction chamber in which the negative electrode precursor is placed. When the reaction of the monomolecular layer of the first raw material with the second raw material is completed, no more second raw material is adsorbed onto the surface of the negative electrode precursor. Excess of the second raw material is purged with an inert gas or the like, and removed from the reaction chamber. By repeating a series of the above operations comprising introduction of the first raw material, purging, introduction of the second raw material, and purging, a first compound is produced, and a film of a solid electrolyte containing the first compound is formed.

Materials used as the first raw material and the second raw material are not particularly limited, and may be selected as appropriate depending on a desired first compound. For example, a raw material containing the element M1 may be used as one of the first and second raw materials, and a raw material containing lithium or a raw material containing the element M1 and lithium may be used as the other of the first and second raw materials. A raw material containing the element M1 and lithium may be used as one of the first and second raw materials, and an oxidizing agent (e.g., oxygen, ozone) may be used as the other of the first and second raw materials.

The raw material containing the element M1 is exemplified by a phosphorus-containing raw material, and a silicon-containing raw material. Examples of the phosphorus-containing raw material include trimethyl phosphate, triethyl phosphate, tris(dimethylamino)phosphine, and trimethylphosphine. Examples of the silicon-containing raw material include tetramethyl orthosilicate and tetraethyl orthosilicate. Examples of the lithium-containing raw material include lithium tertiary butoxide and lithium cyclopentadienyl. Examples of the raw material containing the element M1 and lithium include lithium(bistrimethylsilyl)amide.

After the first compound film formation, a film of a second compound may be formed by the ALD method. In this case, similarly to the first compound film formation, a third raw material and a fourth raw material are selected as appropriate depending on a desired second compound. For example, a raw material containing the element M2 may be used as one of the third and fourth raw materials, and a fluorine-containing raw material or a raw material containing the element M2 and fluorine may be used as the other of the third and fourth raw materials. Examples of the raw material containing the element M2 include: a tertiary butoxide containing the element M2, such as lithium tertiary butoxide; and lithium cyclopentadienyl. Examples of the fluorine-containing raw material include fluorine gas, HF gas, and $NH_4F$. Examples of the material containing the element M2 and fluorine include LiF.

The film of the solid electrolyte may have a two-layered structure comprising a film of the first compound and a film of the second compound formed in this order on the surface of the negative electrode active material layer. The film of the solid electrolyte may have a multilayered structure comprising a film of the first compound and a film of the second compound are repeatedly formed in this order on the surface of the negative electrode active material layer. The film of the second compound has high strength and chemical stability and is excellent in reduction resistance, and therefore can improve the durability of the film of the solid electrolyte. The film of the second compound protects the film of the first compound.

The raw material gas of the first compound and the raw material gas of the second compound may be simultaneously supplied into the reaction chamber, so that a first compound and a second compound are produced simultaneously, to form a film of a solid electrolyte in which the first compound and the second compound are mixed in the same atomic layer. In this case, the effect of the second compound to improve the chemical stability and the reduction resistance of the solid electrolyte, and the effects of the first compound to allow the solid electrolyte to develop lithium ion conductivity and to suppress the contact between the negative electrode and the aqueous electrolyte can be obtained in a well-balanced manner.

In the production of the first compound and the second compound, an oxidizing agent may be introduced into the reaction chamber at any timing, for facilitating the reaction. The oxidizing agent may be introduced once or a plurality of times. In addition to the first to fourth raw materials, a fifth raw material may be further used as the raw material. For example, a series of operations comprising introduction of the first raw material (third raw material), purging, introduction of the second raw material (fourth raw material), purging, introduction of the fifth raw material, and purging may be repeated.

When a fluorocarbon resin, such as polyvinylidene fluoride (PVDF), is used as the binder, part of the fluorocarbon resin may be sublimated in the reaction chamber. The sublimated fluorocarbon resin can be utilized as a fluorine-containing raw material used for the formation of a second compound by the ALD method. With using a fluorocarbon resin as the binder, and using the first and second raw materials that are necessary for producing a first compound, a solid electrolyte film may be formed by the ALD method in which a first compound is mixed in the same atomic layer with a second compound having a bond of a lithium atom and a fluorine atom (LiF).

The first compound and the second compound are preferably produced by the same method, and may be produced by different methods. For example, one of the first and second compounds may be produced by a liquid phase method, and the other may be produced by a gas phase method.

The above method of producing a negative electrode by forming a negative electrode active material layer on a surface of the negative electrode current collector, and forming a solid electrolyte film on the surface of the negative electrode active material layer is advantageous in reducing the negative electrode resistance. In other words, since no solid electrolyte is present at the contact interface between the negative electrode active material particles adjacent to each other, electron conduction paths tend to be secured within the negative electrode active material layer. When the negative electrode active material layer further includes a binder, since the solid electrolyte is absent at the adhesion interface between the negative electrode active material particles and the binder, the distance between the negative electrode active material particles adjacent to each other is small. The solid electrolyte is absent also at the contact interface between the negative electrode active material particles and the negative electrode current collector. When the negative electrode active material layer further includes a conductive agent, the solid electrolyte is absent also at the contact interface between the negative electrode active material particles and the conductive agent.

By forming a solid electrolyte film on the surface of the negative electrode active material layer by the ALD method, the solid electrolyte film is formed at least on the outer surface of the negative electrode active material layer and on the surfaces of the carbon material particles exposed on the inner wall surface of the pores. At this time, a compound having a bond of an M1 atom and a C atom can be formed at the interface between the carbon material particles and the solid electrolyte film containing the first compound. This strengthens the bonding between the solid electrolyte film and the carbon material particles, and can suppress the peeling of the film. Thus, the contact between the carbon material and the aqueous electrolyte during charge and discharge may be stably suppressed.

A microscopic observation of the interface between the negative electrode current collector and the negative electrode active material layer shows that the negative electrode current collector is not completely covered with the negative electrode active material or the like, and has a partially exposed surface in the pores of the negative electrode active material layer connected to the interface. Moreover, the cut end surface of the negative electrode current collector and the surface of a portion to which a lead is to be attached are exposed without being covered with the negative electrode active material layer. Therefore, when a solid electrolyte film is formed on the surface of the negative electrode active material layer by the ALD method, the solid electrolyte film is formed also on the exposed surfaces of the negative electrode current collector.

When a negative electrode active material layer containing an additive, such as a binder and/or a conductive agent, is formed first, and then, a solid electrolyte film is formed on the surface of the negative electrode active material layer by the ALD method, the solid electrolyte film is formed also on the surfaces of the additive exposed on the outer surface of the negative electrode active material layer and on the inner wall surfaces of the pores.

When a solid electrolyte film is formed on the surface of the binder, the film formation is carried out at a temperature lower than the heat resistant temperature of the binder. The temperature for the film formation may be determined as appropriate depending on the kind of the binder, but is preferably 200° C. or lower, more preferably 120° C. or lower.

A solid electrolyte film may be formed on the surface of the carbon material particles to prepare composite particles, and using a negative electrode slurry containing the composite particles, a negative electrode active material layer having a surface covered with the solid electrolyte may be formed. In this case, since the surfaces of the carbon material particles are densely covered with the solid electrolyte, an excessive formation of an SEI film can be effectively suppressed.

A detailed description will be given below of each of the components.

(Negative Electrode)

The negative electrode includes, for example, a negative electrode current collector, a negative electrode active material layer supported on a surface of the negative electrode current collector, and a solid electrolyte film covering at least part of the surface of the negative electrode active material layer. The solid electrolyte film contains at least a first compound and may further contain a second compound.

The negative electrode active material layer may be formed on one surface or both surfaces of the negative electrode current collector.

(Negative Electrode Current Collector)

Examples of the negative electrode current collector include a metal foil, a metal sheet, a mesh, a punched sheet, and an expanded metal. The negative electrode current collector may be made of stainless steel, nickel, copper, a copper alloy, titanium or the like. The thickness of the negative electrode current collector can be selected from the range of, for example, 3 to 50 μm.

(Negative Electrode Active Material Layer)

The negative electrode active material layer may include, for example, a negative electrode active material and a binder, and may further contain a conductive agent. The binder is contained in the negative electrode active material layer in an amount of preferably 0.1 to 20 parts by mass, more preferably 1 to 5 parts by mass, per 100 parts by mass of the negative electrode active material. The thickness of the negative electrode active material layer is, for example, 10 to 100 μm.

The negative electrode active material contains at least a carbon material. The carbon material usually absorbs and releases lithium ions at a potential of 1 V or less versus metal lithium. In this potential region, water contained in the aqueous electrolyte tends to be decomposed on the surface of the carbon material, to generate protons. However, since the surface of the negative electrode active material layer is covered with a solid electrolyte containing the first compound, the contact between the carbon material and the aqueous electrolyte can be suppressed, and the decomposition of water can be suppressed.

Examples of the carbon material used as the negative electrode active material include graphite, graphitizable carbon (soft carbon), and non-graphitizable carbon (hard carbon). In particular, graphite is preferred because it is stable during charge and discharge and has high capacity and its irreversible capacity is small. The graphite means a material having a graphite-like crystal structure, examples of which include natural graphite, artificial graphite, and graphitized mesophase carbon particles. The carbon material may be used singly or in combination of two or more kinds. Among them, graphite is promising in terms of its high capacity and small irreversible capacity. Usually, a carbon material in which the interplanar spacing $d_{002}$ of the 002 plane of the graphite structure as calculated from its X-ray diffraction spectrum is 3.35 to 3.44 angstroms is classified as graphite. On the other hand, the hard carbon is a carbon material in which fine graphite crystals are oriented randomly, and further graphitization hardly proceeds. The interplanar spacing $d_{002}$ of the 002 plane is greater than 3.70 angstroms.

The negative electrode active material may further contain an alloy-type material. The alloy-type material may be a material containing at least one of silicon and tin, and preferably is silicon single substance or a silicon compound. The silicon compound includes a silicon oxide and a silicon alloy.

In view of increasing the packability of the negative electrode active material, the negative electrode active material particles preferably have an average particle diameter (D50) which is sufficiently small relative to the thickness of the negative electrode active material layer. The average particle diameter (D50) of the negative electrode active material particles is preferably 5 to 30 μm, more preferably 10 to 25 μm. The average particle diameter (D50) means a median diameter at 50% cumulative volume in a volume-based particle size distribution. The average particle diameter can be measured by, for example, using a laser diffraction/scattering type particle size distribution analyzer.

In view of suppressing the reductive decomposition of water contained in the aqueous electrolyte at the surface of the negative electrode active material, the negative electrode active material particles preferably have a BET specific surface area which is sufficiently small. The BET specific surface area of the negative electrode active material particles is, for example, 0.7 $m^2/g$ or more and 4.5 $m^2/g$ or less, preferably 1 $m^2/g$ or more and less than 3 $m^2/g$. When the BET specific surface area of the negative electrode active material particles is 0.7 $m^2/g$ or more, the absorption and release of lithium ions by the negative electrode active material can smoothly proceed. The interface resistance of the negative electrode is reduced. When the BET specific surface area of the negative electrode active material particles is 4.5 $m^2/g$ or less, the active points of water decomposition on the surface of the negative electrode active material are decreased, and the generation of hydrogen is suppressed.

Examples of the binder include: fluorocarbon resins, such as polyvinylidene fluoride (PVDF), polytetrafluoroethylene (PTFE), and tetrafluoroethylene-hexafluoropropylene copolymer (FEP); acrylic resins, such as polymethyl acrylate and ethylene-methyl methacrylate copolymer; rubbery materials, such as styrene-butadiene rubber (SBR) and acrylic rubber; and water-soluble polymers, such as carboxymethyl cellulose (CMC) and polyvinylpyrrolidone. The binder may be used singly or in combination of two or more kinds. In the case of using an electrolytic solution containing water, NMP is preferably used as the dispersion medium of a negative electrode slurry used for forming a negative electrode active material layer, and a fluorocarbon resin, such as PVDF, PTFE or FEP is preferably used as the binder. In particular, PVDF is preferred. With a fluorocarbon resin, which is excellent in reduction resistance, the binding force between the negative electrode active material particles can be stably maintained in the negative electrode during charge and discharge. Furthermore, the structure of the electrode can be stably retained in the electrolytic solution containing water.

Examples of the conductive agent include: carbons, such as acetylene black, Ketjen black, carbon nanotubes, carbon nanofibers, carbon nanohorns, and graphene; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. The conductive agent may be used singly or in combination of two or more kinds.

(Positive Electrode)

The positive electrode includes, for example, a positive electrode current collector and a positive electrode active material layer supported on a surface of the positive electrode current collector. Examples of the positive electrode current collector include a metal foil and a metal sheet. The positive electrode current collector may be made of stainless steel, aluminum, an aluminum alloy, titanium or the like. The positive electrode active material layer can be formed using a positive electrode slurry containing a positive electrode material mixture and a dispersion medium. The positive electrode active material layer and the positive electrode material mixture may include, for example, a positive electrode active material and a binder, and may further contain a conductive agent. As the binder, the conductive agent, and the dispersion medium, those exemplified for the negative electrode can be used. In the positive electrode, graphite may be used as the conductive agent.

The positive electrode active material may be a lithium-containing composite oxide. Examples of the transition metal element include Sc, Y, Mn, Fe, Co, Ni, Cu, and Cr. In particular, Mn, Co, Ni and the like are preferred. Specific examples of the lithium-containing composite oxide include $LiCoO_2$, $LiNiO_2$, and $LiMn_2O_4$.

The aforementioned solid electrolyte may cover at least part of the surface of the positive electrode active material. This can suppress the contact between the positive electrode active material and water contained in the aqueous electrolyte, and suppress the decomposition of water at the surface of the positive electrode active material. The aforementioned solid electrolyte may cover at least part of the surface of the positive electrode active material. When the positive electrode active material layer is a porous layer, the surface of the positive electrode active material layer is not limited to the outer surface of the positive electrode active material layer facing the negative electrode, and includes the inner wall surfaces of the pores present in the positive electrode active material layer.

The aforementioned solid electrolyte may cover at least part of the surface of the positive electrode current collector. When the positive electrode active material layer contains a conductive agent, the solid electrolyte may cover at least part of the surface of the conductive agent. This can suppress the contact of the positive electrode current collector and/or the conductive agent with the aqueous electrolyte, and suppress the decomposition of water at the surface of the positive electrode current collector and/or the conductive agent.

(Separator)

The separator may be a microporous film, a nonwoven fabric, a woven fabric, or the like made of a resin. Examples of the resin include polyolefin, such as polyethylene and polypropylene, polyamide, and polyamide imide.

(Electrolytic Solution)

The electrolytic solution includes a solvent and a lithium salt, and the solvent contains at least water. By using water, which is not flammable, in at least part of the solvent, the safety of the secondary battery can be enhanced. The solvent may comprise water only, or may be a mixed solvent of water and a small amount of an organic solvent. The proportion of water in the solvent may be 75 vol % or more, and may be 85 vol % or more.

The lithium salt may be constituted of a lithium cation and an imide anion, and is exemplified by an imide salt, such as $LiN(SO_2F)_2$, $LiN(SO_2CF_3)_2$, $LiN(SO_2C_2F_5)$, and $LiN(SO_2CF_3)(SO_2C_2F_5)$. Examples of the lithium salt include $LiCF_3SO_3$. The above lithium salts are highly soluble in water being the solvent and highly stable, and therefore, are preferable. In particular, $LiN(SO_2CF_3)_2$ and $LiN(SO_2C_2F_5)_2$ are preferable. The lithium salt can be used singly or in combination of two or more kinds.

The amount of water in the electrolyte is preferably 0.5 mol or more and 4 mol or less per 1 mol of the lithium salt, and more preferably 0.5 mol or more and 3 mol or less. In this case, the water activity decreases, and the potential window of the aqueous electrolyte broadens, enabling to increase the voltage of the secondary battery to as high as 4 V or more.

In order to control the pH of the electrolytic solution, an acid or an alkali may be further added to the electrolyte solution. The acid that may be added includes $CF_3SO_3H$, $HN(SO_2CF_3)_2$, and $HN(SO_2C_2F_5)_2$ having an imide anion. The alkali that may be added includes LiOH. For increasing the voltage of the secondary battery to 2 V or more, alkali is effective, and LiOH is particularly effective.

The electrolytic solution preferably contains a component that reductively decomposes at a potential nobler than the reduction potential of the solid electrolyte containing the first compound. By containing the above component in the electrolytic solution, the reductive decomposition of the component preferentially occurs during charge, and the reductive decomposition of the solid electrolyte containing the first compound is likely to be suppressed. As a result of the reductive decomposition of the component, a film of solid electrolyte interface (SEI) derived from the component can be formed on the surface of the solid electrolyte containing the first compound. The SEI film protects the solid electrolyte containing the first compound. Therefore, the effect of the solid electrolyte to suppress the contact between the carbon material and the aqueous electrolyte can be stably obtained.

The above component preferably contains a fluorine-containing compound. In this case, as the reductive decomposition of the fluorine-containing compound proceeds, a more stable SEI film containing fluorine is easily formed on the surface of the solid electrolyte containing the first compound, and the decomposition of the solid electrolyte containing the first compound is suppressed. The SEI film derived from the fluorine-containing compound can include the second compound. For example, a secondary battery fabricated using a negative electrode with the surface of the negative electrode active material layer covered with a film containing the first compound, and using an electrolytic solution containing a fluorine-containing compound is subjected to charge and discharge. The fluorine-containing compound is reductively decomposed at the negative electrode, and thus, a film containing the second compound can be formed on the surface of the film containing the first compound.

Examples of the fluorine-containing compound include a fluorinated cyclic carbonic acid ester, a fluorinated chain carbonic acid ester, and lithium fluorophosphate. In particular, a fluorinated cyclic carbonic acid ester is preferred. As a result of the reductive decomposition of the fluorinated cyclic carbonic acid ester, a more stable SEI film containing the second compound is easily formed on the surface of the solid electrolyte containing the first compound.

Examples of the fluorinated cyclic carbonic acid ester include fluoroethylene carbonate (FEC), 1,2-difluoroethylene carbonate, 1,1-difluoroethylene carbonate, 1,1,2-trifluoroethylene carbonate, tetrafluoroethylene carbonate, 1-fluoro-2-methylethylene carbonate, 1,2-difluoro-1-methylethylene carbonate, 1,1,2-trifluoro-2-methylethylene carbonate, trifluoromethyl ethylene carbonate, and trifluoropropylene carbonate (TFPC). In particular, fluoroethylene carbonate, 1,2-difluoroethylene carbonate, 1,1-difluoroethylene carbonate, 1,1,2-trifluoroethylene carbonate, and tetrafluoroethylene carbonate are preferred, and fluoroethylene carbonate is particularly preferred. The above component may be used singly or in combination of two or more kinds.

The electrolytic solution may include a chain carbonic acid ester (excluding the aforementioned fluorinated chain carbonic acid esters). Examples of the chain carbonic acid ester include diethyl carbonate (DEC), ethyl methyl carbonate (EMC), and dimethyl carbonate (DMC). By the addition of the chain carbonic ester, the viscosity of the electrolytic solution can be lowered. The electrolytic solution is allowed to easily penetrate into the negative electrode active material layer. The SEI film is easily formed on the surface of the carbon material over the entire region of the negative electrode active material layer, and the contact with the electrolytic solution of the carbon material associated with its expansion during charge is likely to be suppressed. By the addition of the chain carbonic ester, the SEI film containing the second compound can further contain a product (e.g., lithium carbonate) produced by reductive decomposition of the chain carbonic acid ester, and the lithium ion conductivity of the SEI film can be improved.

Since the film containing the first compound is formed on the surface of the carbon material, excessive formation of an SEI film can be avoided, and the overall thickness of the solid electrolyte film which is a combination of the film containing the first compound and the SEI film can be maintained appropriately. Thus, the increase of the internal resistance can be suppressed.

The secondary battery, for example, has a structure in which an electrode group formed by winding the positive electrode and the negative electrode with the separator interposed therebetween is housed in an outer case, together with the electrolyte. The wound-type electrode group may be replaced with a different form of electrode group, for example, a stacked-type electrode group formed by stacking the positive electrode and the negative electrode with the separator interposed therebetween. The secondary battery may be in any form, such as cylindrical type, prismatic type, coin type, button type, or laminate type.

A description will be given below of a structure of a prismatic secondary battery as an example of the secondary battery according to the present disclosure, with reference to the FIGURE. The FIGURE is a partially cut-away schematic oblique view of a secondary battery according to an embodiment of the present invention.

The battery includes a bottomed prismatic battery case 4, and an electrode group 1 and an electrolytic solution (not shown) housed in the battery case 4. The electrode group 1 has a long belt-shaped negative electrode, a long belt-shaped positive electrode, and a separator interposed therebetween and preventing them from directly contacting with each other. The electrode group 1 is formed by winding the negative electrode, the positive electrode, and the separator around a flat plate-like winding core, and then removing the winding core.

A negative electrode lead 3 is attached at its one end to the negative electrode current collector of the negative electrode, by means of welding or the like. The negative electrode lead 3 is electrically connected at its other end, via an insulating plate made of resin (not shown), to a negative electrode terminal 6 disposed at a sealing plate 5. The negative electrode terminal 6 is electrically insulated from the sealing plate 5 by a gasket 7 made of resin. A positive electrode lead 2 is attached at its one end to the positive electrode current collector of the positive electrode, by means of welding or the like. The positive electrode lead 2 is electrically connected at its other end, via the insulating plate, to the back side of the sealing plate 5. In short, the positive electrode lead 2 is electrically connected to the battery case 4 serving as a positive electrode terminal. The insulating plate serves to insulate the electrode group 1 from the sealing plate 5, as well as to insulate the negative electrode lead 3 from the battery case 4. The peripheral edge of the sealing plate 5 is fitted to the opening end of the battery case 4, and the fitting portion is laser-welded. In this way, the opening of the battery case 4 is sealed with the sealing plate 5. An electrolyte injection hole provided in the sealing plate 5 is closed with a sealing stopper 8.

EXAMPLES

The present disclosure will be more specifically described below with reference to Examples and Comparative Examples. It should be noted, however, that the present disclosure is not limited to the following Examples.

Example 1

A three-electrode electrochemical cell for evaluation was produced in the following procedure.

(1) Production of Negative Electrode

A negative electrode slurry was prepared by mixing hard carbon (HC) powder (average particle diameter (D50): 9 μm) serving as a negative electrode active material, and polyvinylidene fluoride (PVDF) serving as a binder, with an appropriate amount of NMP. The PVDF was added in an amount of 4.17 parts by mass per 100 parts by mass of HC.

The negative electrode slurry was applied to one surface of a 10-μm-thick copper foil (negative electrode current collector). The applied film was dried at 80° C. and rolled, to form a negative electrode active material layer. In this way, a negative electrode precursor with the negative electrode active material layer supported on one surface of the negative electrode current collector was prepared. Thereafter, the negative electrode precursor was cut into a predetermined size (strip type: 12 cm by 18 cm). The total thickness of the negative electrode active material layer and the negative electrode collector was 50 The applied amount and the packed density of the negative electrode active material layer on the surface of the copper foil were 32.3 g/m$^2$ and 0.9 g/cm$^3$, respectively. Note that the negative electrode active material layer formed above includes a negative electrode active material and a binder.

The negative electrode precursor was placed in a predetermined reaction chamber, and a solid electrolyte film was formed on the surface of the negative electrode active material layer in the following procedure, to produce a negative electrode.

(i) A first raw material was vaporized and introduced into the reaction chamber in which the negative electrode precursor was placed. The first raw material used here was trimethyl phosphate, i.e., a phosphorus-containing raw material. The atmosphere containing the first raw material was controlled to a temperature of 120° C. and a pressure of 260 Pa. After 30 seconds, assuming that the surface of the negative electrode precursor had been covered with a monomolecular layer of the first raw material, excess of the first raw material was purged with nitrogen gas.

(ii) Next, a second raw material was vaporized and introduced into the reaction chamber in which the negative electrode precursor was placed. The second raw material used here was lithium(bistrimethylsilyl)amide, i.e., a lithium-containing raw material. The atmosphere containing the second raw material was controlled to a temperature of 120° C. and a pressure of 260 Pa. After 30 seconds, assuming that the monomolecular layer of the first raw material had reacted with the second raw material, excess of the second raw material was purged with nitrogen gas.

(iii) A series of operations comprising introduction of the first raw material, purging, introduction of the second raw material, and purging was repeated 20 times in total. In this way, a solid electrolyte film containing $Li_3PO_4$ as the first compound was formed on the surface of the negative electrode active material layer. Analysis by XPS, ICP emission spectrometry, and nuclear magnetic resonance (NMR) confirmed that the film had a composition of $Li_3PO_4$.

The amount of the solid electrolyte contained in the negative electrode was approximately 0.8 parts by mass per 100 parts by mass of the carbon material. The amount of the solid electrolyte was determined based on the mass of the negative electrode precursor, the mass of the negative electrode, the mass of the negative electrode current collector, and the composition ratio of the materials in the negative electrode active material layer. The thickness of the solid electrolyte film as determined by SEM cross-section observation and XPS was approximately 15 nm. The coverage rate CR as determined by the already described method was 89%. The area ratio S2/S1 as determined by the already described method was 0.0067. After a CV measurement as described later, the proportion of the first compound in the solid electrolyte was determined by the already described method, which was 87.1 mass %.

(2) Production of Positive Electrode

A positive electrode slurry was prepared by mixing lithium cobaltate (LCO) serving as a positive electrode active material, acetylene black (AB) serving as a conductive agent, and polyvinylidene fluoride (PVDF) serving as a binder, with an appropriate amount of a dispersion medium. The AB was added in amount of 3.19 parts by mass per 100 parts by mass of LCO. The PVDF was added in an amount of 3.19 parts by mass per 100 parts by mass of LCO. The dispersion medium used here was N-methyl-2-pyrrolidone (NMP).

Next, the obtained positive electrode slurry was applied to one surface of a 15-μm-thick titanium foil (positive electrode current collector). The applied film was dried at 80° C. and rolled, to form a positive electrode active material layer. In this way, a positive electrode having a positive electrode active material layer supported on one surface of the positive electrode collector was produced. The total thickness of the positive electrode active material layer and the positive electrode current collector was 40 The applied amount and the packed density of the positive electrode active material layer on the surface of the titanium foil were 65.0 g/m$^2$ and 2.8 g/cm$^3$, respectively. Note that the positive electrode active material layer formed above includes a positive electrode active material, a binder, and a conductive agent.

(3) Preparation of Electrolytic Solution $LiN(SO_2CF_3)_2$(LiTFSI) and $LiN(SO_2C_2F_5)_2$(LiBETI), water, dimethyl carbonate (DMC), and fluoroethylene carbonate (FEC) were mixed in a molar ratio of 0.7:0.3:2:0.06:0.05, to prepare an electrolytic solution.

(4) Fabrication of Electrochemical Cell

The negative electrode and the positive electrode obtained above were each cut into a predetermined size and used as a working electrode and a counter electrode. With the positive electrode and the negative electrode arranged such that the positive electrode active material layer and the negative electrode active material layer faced each other, and an Ag/AgCl electrode (internal solution: 3 M of NaCl aqueous solution) used as a reference electrode, a three-electrode electrochemical cell was fabricated. In the electrochemical cell, the areas exposed to the electrolyte solution of the positive electrode active material layer and the negative electrode active material layer were 0.28 cm$^2$ and 1 cm$^2$, respectively. For the electrolytic solution, the electrolytic solution prepared above was used.

Example 2

LiTFSI, water, DMC, and FEC were mixed in a molar ratio of 1.0:1.8:0.12:0.10, to prepare an electrolytic solution. Except for using this aqueous electrolyte, an electrochemical cell was prepared in the same manner as in Example 1. After a CV measurement as described later, the proportion of the first compound in the solid electrolyte was determined by the already described method, which was 66.1 mass %.

Comparative Example 1

An electrochemical cell was prepared in the same manner as in Example 1, except that the negative electrode precursor was used as a negative electrode, without forming the solid electrolyte film on the surface of the negative electrode active material layer.

Comparative Example 2

An electrochemical cell was prepared in the same manner as in Example 2, except that the negative electrode precursor was used as a negative electrode, without forming the solid electrolyte film on the surface of the negative electrode active material layer.

[Evaluation: Cyclic Voltammetry (CV) Measurement]

The electrochemical cells of Examples 1 to 2 and Comparative Examples 1 to 2 obtained above were subjected to CV measurement under the following conditions. The first reversing potential and the second reversing potential described below were 0.288 V and 3 V, respectively, versus $Li/Li^+$.

Starting potential: Open circuit potential (OCP)
First reversing potential: —2.950 V (vs. Ag/AgCl)
Second reversing potential: —0.238 V (vs. Ag/AgCl)
Cycle: once
Scanning speed: 0.5 mV/sec
Measurement temperature: 25° C.

Using the analysis software included in the electrochemical measurement device, the current-potential curve obtained in the above CV measurement was converted into a current-time curve, and the reduction peak and the oxidation peak were integrated, to calculate a reduction electricity quantity and an oxidation electricity quantity, respectively. An initial efficiency (%) was calculated using the following formula. When the above peaks are present in plural numbers or when the peaks are too broad to detect, the reduction electricity quantity and the oxidation electricity quantity were calculated throughout the region.

Initial efficiency (%)=(Oxidation electricity quantity (C))/(Reduction electricity quantity (C))·100

The evaluation results are shown in Table 1.

containing $Li_3PO_4$ was formed on the surface of the negative electrode active material layer containing HB as the negative electrode active material, the absorption and release of lithium ions failed to proceed at the negative electrode.

INDUSTRIAL APPLICABILITY

A secondary battery according to the present disclosure is useful as a driving power source for personal computers, mobile phones, mobile devices, personal digital assistants (PDAs), portable game players, video cameras and the like, a main or auxiliary power source for motor driving of hybrid electric vehicles, plug-in HEVs, and the like, and a driving power source for electrically-powered tools, vacuum cleaners, robots, and the like.

REFERENCE SIGNS LIST 1 electrode group
2 positive electrode lead
3 negative electrode lead
4 battery case
5 sealing plate
6 negative electrode terminal
7 gasket
8 sealing stopper

The invention claimed is:

1. A secondary battery, comprising:
a positive electrode; a negative electrode; and an electrolytic solution, wherein
the negative electrode includes a carbon material electrochemically capable of absorbing and releasing lithium ions, and a solid electrolyte covering at least part of a surface of the carbon material and having lithium ion conductivity,
the solid electrolyte includes
a first compound represented by a general formula: $Li_xM1O_y$,
where $0.5<x\leq9$, $1\leq y<6$, and the M1 includes at least one element selected from the group consisting of B, Al, Si, P, Ti, V, Zr, Nb, Ta, and La, and
a second compound containing a fluorine atom and an M2 atom bonded to the fluorine atom, where M2 is at least one selected from the group consisting of Li, Mg, Ca, Sr, Ba, La, Ce, Sm, Ga, Bi, and Al,

| | Solid electrolyte film formed on negative electrode active material layer | Proportion of first compound in solid electrolyte (mass %) | Electrolytic solution | Initial efficiency (%) |
|---|---|---|---|---|
| Ex. 1 | With | 87.1 | LiTFSI:LiBETI:H₂O:DMC:FEC = 0.7:0.3:2.0:0.06:0.05 | 2.54 |
| Ex. 2 | With | 66.1 | LiTFSI:H₂O:DMC:FEC = 1.0:1.8:0.12:0.10 | 4.16 |
| Com. Ex. 1 | Without | — | LiTFSI:LiBETI:H₂O:DMC:FEC = 0.7:0.3:2.0:0.06:0.05 | 0 |
| Com. Ex. 2 | Without | — | LiTFSI:H₂O:DMC:FEC = 1.0:1.8:0.12:0.10 | 0 |

In Examples 1 and 2 in which a solid electrolyte film containing $Li_3PO_4$ was formed on the surface of the negative electrode active material layer containing HB as the negative electrode active material, the absorption and release of lithium ions proceeded at the negative electrode. In Comparative Examples 1 and 2 in which no solid electrolyte film the electrolytic solution includes a solvent and a lithium salt, and
the solvent contains at least water.

2. The secondary battery according to claim 1, wherein the first compound is a polyoxometalate compound.

3. The secondary battery according to claim 2, wherein the polyoxometalate compound includes at least one compound selected from the group consisting of $Li_3PO_4$, $Li_2SiO_3$, $Li_4SiO_4$, $Li_2Si_2O_5$ and $LiTaO_3$.

4. The secondary battery according to claim 1, wherein a proportion of the first compound in the solid electrolyte is 65 mass % or more.

5. The secondary battery according to claim 1, wherein the solid electrolyte covers 70% or more of the surface of the carbon material.

6. The secondary battery according to claim 1, wherein the negative electrode includes a negative electrode current collector, a layer supported on the negative electrode current collector and containing the carbon material, and the solid electrolyte covering at least part of a surface of the layer.

7. The secondary battery according to claim 6, wherein the solid electrolyte covers at least part of a surface of the negative electrode current collector.

8. The secondary battery according to claim 6, wherein the layer includes a conductive agent, and
the solid electrolyte covers at least part of a surface of the conductive agent.

9. The secondary battery according to claim 1, wherein the solid electrolyte has a thickness of 0.5 nm or more.

10. The secondary battery according to claim 1, wherein the solid electrolyte has a thickness of 0.5 nm or more and less than 50 nm.

11. The secondary battery according to claim 1, wherein the electrolytic solution contains a component that is reductively decomposed at a potential nobler than a reduction potential of the solid electrolyte.

12. The secondary battery according to claim 11, wherein the component includes a fluorine-containing compound.

13. The secondary battery according to claim 12, wherein the fluorine-containing compound includes a fluorinated cyclic carbonic acid ester.

14. The secondary battery according to claim 13, wherein the fluorinated cyclic carbonic acid ester includes at least one selected from the group consisting of fluoroethylene carbonate, 1,2-difluoroethylene carbonate, 1,1-difluoroethylene carbonate, 1,1,2-trifluoroethylene carbonate, and tetrafluoroethylene carbonate.

15. The secondary battery according to claim 13, wherein the electrolytic solution further includes a chain carbonic acid ester.

16. The secondary battery according to claim 1, wherein the lithium salt includes a salt constituted of a lithium cation and an imide anion.

17. A secondary battery, comprising:
a positive electrode; a negative electrode; and an electrolytic solution, wherein
the negative electrode includes a carbon material electrochemically capable of absorbing and releasing lithium ions, and a solid electrolyte covering at least part of a surface of the carbon material and having lithium ion conductivity,
the solid electrolyte includes a first compound represented by a general formula: $Li_xM1O_y$,
where $0.5<x\leq9$, $1\leq y<6$, and the M1 includes at least one element selected from the group consisting of B, Al, Si, P, Ti, V, Zr, Nb, Ta, and La,
wherein the solid electrolyte has a thickness of 0.5 nm or more and less than 50 nm,
the electrolytic solution includes a solvent and a lithium salt, and
the solvent contains at least water.

* * * * *